United States Patent [19]

Isono et al.

[11] 4,206,473
[45] Jun. 3, 1980

[54] VIR-CONTROLLED COLOR CORRECTION FOR COLOR VIDEO SIGNAL RECEIVING APPARATUS

[75] Inventors: Katsuo Isono, Kawagoe; Seiji Sanada, Yokosuka, both of Japan

[73] Assignee: Sony Corporation, Tokyo, Japan

[21] Appl. No.: 875,974

[22] Filed: Feb. 8, 1978

[30] Foreign Application Priority Data

Feb. 8, 1977 [JP] Japan .................................. 52-12666

[51] Int. Cl.² ............................................ H04N 9/535
[52] U.S. Cl. ................................................ 358/21 V
[58] Field of Search ................... 358/10, 28, 27, 21 V

[56] References Cited
U.S. PATENT DOCUMENTS

| | | | |
|---|---|---|---|
| 4,059,838 | 11/1977 | Banker et al. | 358/10 X |
| 4,088,025 | 5/1978 | Banker et al. | 358/28 X |
| 4,101,927 | 7/1978 | Isono et al. | 358/28 X |

OTHER PUBLICATIONS

"A New LSI Integrated Circuit for Line Recognition and VIR Signal Processing in Television Receivers", IEEE TRANSACTION ON CONSUMER ELECTRONICS, vol. CE-24, No. 3, Aug. 78, pp. 191-199: Barton & Sadler.

*Primary Examiner*—Robert L. Griffin
*Assistant Examiner*—Aristotelis M. Psitos
*Attorney, Agent, or Firm*—Lewis H. Eslinger; Alvin Sinderbrand

[57] ABSTRACT

Hue and color saturation are controlled in response to a received VIR signal, the latter having a chrominance reference portion and a luminance reference portion. The level of a preselected one or more demodulated color signals which are produced by the color demodulator in color video signal receiving apparatus is detected during the time that the VIR signal is received. The level-detected demodulated color signal is used to produce a control signal for controlling the hue or color saturation. A storage circuit, such as a capacitor, is provided to store the control signal throughout the duration which separates successive VIR signals. A VIR detector is provided for detecting the presence of a VIR signal in the received video signal; and when the absence of a VIR signal from the received video signal is detected, the control signal storage circuit is preset to a predetermined value. By so presetting the storage circuit, the time required for successful VIR-controlled color correction is minimized when the video signal receiving apparatus is switched from, for example, one broadcast channel which does not include a VIR signal to another broadcast channel which does include a VIR signal.

In a preferred embodiment, both hue and color saturation are controlled in response to a VIR signal. The level of a selected color difference signal (R-Y), produced during the chrominance reference portion of the VIR signal, is used to control hue; and the level of a simulated color drive signal (B), also produced during the chrominance reference portion of the VIR signal, is used to control color saturation.

19 Claims, 20 Drawing Figures

B-Y OUTPUT

0

(−)

B OUTPUT

B' OUTPUT

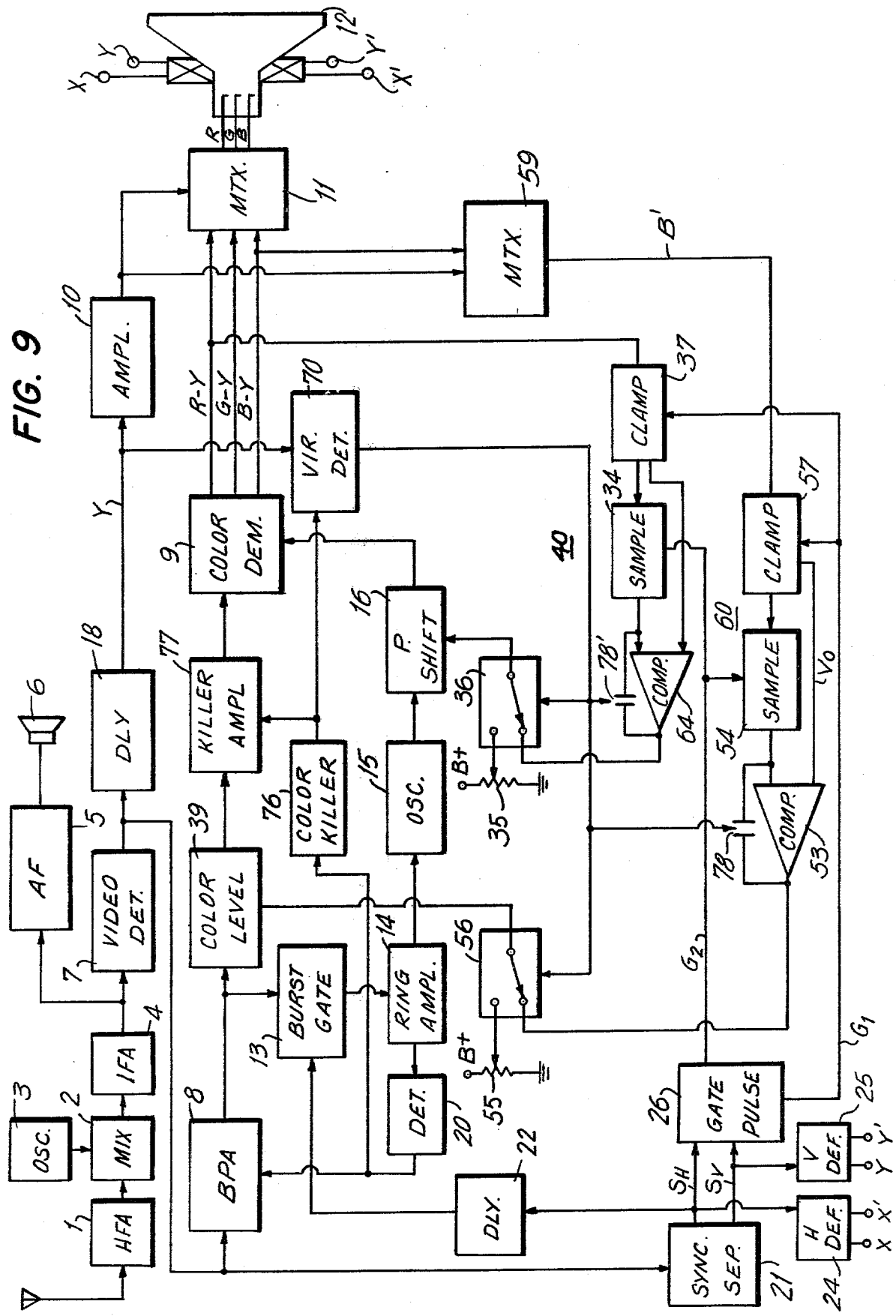

VIR-CONTROLLED COLOR CORRECTION FOR COLOR VIDEO SIGNAL RECEIVING APPARATUS

BACKGROUND OF THE INVENTION

This invention relates to color correction apparatus for use in color video signal receiving apparatus and, more particularly, to such color correction apparatus which is responsive to a VIR signal and which exhibits an improved response time so as to minimize the time required for an initial color correction operation.

Recently, various color television broadcasts have inserted a reference signal during a predetermined, recurrent interval for the purpose of automatically controlling a color television receiver to reproduce a video picture having optimum color characteristics. This reference signal is inserted into the nineteenth line interval of the vertical blanking interval, and is known as the vertical interval reference (VIR) signal.

The VIR signal which has been adopted in the industry is formed of a reference subcarrier, equal in frequency and phase to the usual burst signal which normally is transmitted in successive line intervals of the color video signal, this reference subcarrier being superposed upon some reference luminance level and being transmitted during a preselected chrominance reference portion of the VIR signal. Following this chrominance reference portion, the VIR signal is provided with a luminance reference portion of predetermined amplitude and duration. A black reference portion of a respectively predetermined amplitude and duration then follows the luminance reference portion. As in the transmission of a normal line interval, the VIR signal also includes horizontal synchronizing pulses and a burst signal.

It is expected that, when a transmitted video signal having the VIR signal is received, the reference information provided by the VIR signal can be used to control the color video signal receiving apparatus such that the reproduced color picture exhibits optimum color characteristics. That is, this VIR signal can be used to control the phase of the generated local oscillating signal which, as is known, demodulates the received chrominance component such that the phase of this local oscillating signal determines the hue or tint of the color picture. Also, the information provided by the VIR signal can be used to control the level of the received chrominance component prior to demodulation thereof, so as to control the color saturation of the reproduced color picture. Therefore, by automatically controlling the phase of the local oscillating signal and the level of the received chrominance component in accordance with optimum standards, such as the NTSC standard, as represented by the VIR signal, a correspondingly optimum color video picture can be reproduced.

The subcarrier included in the chrominance reference portion of the VIR signal is in phase quadrature with the R-Y axis. Hence, if the hue of the reproduced color picture is correct, then, during the chrominance reference portion of the VIR signal, it is expected that the demodulated R-Y color difference signal will be equal to some reference level. VIR-controlled color correction circuitry is designed to detect the R-Y color difference signal during the chrominance reference portion of the VIR signal and to adjust the phase of the local oscillating signal until the R-Y color difference signal is equal to the reference level. Correct hue then will be established.

Also, the luminance to chrominance proportioning of the chrominance reference portion of the VIR signal is such that, at the correct saturation level (i.e., when the level of the chrominance component is correct), one of the color drive signals is zero. In particular, the phase of the subcarrier transmitted during the chrominance reference portion is along the -(B-Y) axis, and the luminance of chrominance ratio of the chrominance reference portion is 2.03. This means that the blue drive signal derived from the demodulated B-Y color difference signal is zero. In the VIR-controlled color correction circuitry, the gain of a chrominance amplifier is controlled as a function of the derived blue drive signal so as to adjust the level of the chrominance component until the blue drive signal is detected as zero, thereby establishing the correct color saturation.

The foregoing VIR-controlled color correction is disclosed in U.S. Pat. No. 3,950,780, issued Apr. 13, 1976. In the color correction system disclosed in this patent, the color difference signal which is used for controlling hue and the color drive signal which is used for controlling saturation are compared to reference levels which are derived from the VIR signal itself. However, because of the particular format of the VIR signal, it is necessary for the color difference signal or the color drive signal to be sampled during one vertical blanking interval and to be compared to the derived reference levels during the next following vertical blanking interval. Consequently, the sampled color difference signal and the sampled color drive signal must be stored for the duration of one frame. As a result of inherent leakage and other distortions in the storage circuitry, and because of other changes which may occur from one frame to the next, inaccuracies are introduced into the color correction arrangement disclosed in U.S. Pat. No. 3,950,780.

An improved VIR-controlled color correction circuit is disclosed in our copending application Ser. No. 839,847 filed Oct. 6, 1977. In this improved color correction circuit, the problem of storing a color difference signal or a color drive signal or a derived reference level throughout a frame interval is avoided. The improved circuit proceeds upon the basis that one of the demodulated color difference signals, that is, the R-Y signal, will have the same amplitude during the chrominance reference portion and the immediately following luminance reference portion. Hence, this color difference signal is sampled during the chrominance reference portion and then during the luminance reference portion, and the samples are compared to each other. Any difference therebetween is caused by an error in the hue of the reproduced video picture, and the resultant difference signal is used to adjust the hue accordingly. Similarly, it is known that the level of a simulated color drive signal, such as the blue drive signal, produced during the chrominance reference portion of the VIR signal will be the same during the immediately following luminance reference portion. Hence, the simulated color drive signal is sampled during the chrominance reference portion and then sampled again during the luminance reference portion, these samples being compared to each other. Any difference between the samples of the simulated color drive signal is due to an error in the saturation of the reproduced video picture, and this signal difference is used to adjust the color saturation level accordingly.

In the color correction circuit disclosed in U.S. Pat. No. 3,950,780, and in our aforedescribed improved color correction circuit, the hue and saturation control signals are produced or updated only during the VIR interval, that is, only during every nineteenth line interval. Consequently, storage circuits must be provided to store these control signals for use during the times between which control signals are updated.

If a received video signal does not include a VIR signal, it is important that the control signals which normally are produced in response to the VIR signal are not applied to the hue and saturation control circuits. Typically, switching devices are controlled by a VIR detector for connecting either manually adjustable devices or the VIR-responsive control signals to the hue and saturation control circuits. However, even if the VIR-responsive control signal generators are not connected to the hue and saturation control circuits, nevertheless, such control signal generators may be responsive to the particular color difference signal and simulated color drive signal which are produced during each nineteenth line interval. As a consequence thereof, the hue and saturation control signal storage circuits may store unpredictable, transient signals. Such stored signals may exhibit maximum or minimum levels. If the video signal receiving apparatus which includes this color correction apparatus suddenly is switched from a broadcast channel which does not include a VIR signal to a broadcast channel which does include a VIR signal, the fact that the signals which are stored in the hue and saturation control signal storage circuits are unpredictable and may have maximum or minimum levels that an extended period of time may be necessary in order for such stored signals to change to the proper control signal levels. Similarly, when the power supply for the video signal reproducing apparatus initially is turned on, the signals which are stored in the hue and saturation control signal circuits as a result of turn-on transients may be unpredictable and may exhibit maximum or minimum values. Here too, an extended period of time is required until such stored transient levels are modified, under the control of the VIR signal, to proper hue and saturation control signal levels. This problem also may occur if a spurious noise signal is present during the nineteenth line interval, that is, when a proper VIR signal is expected. Thus, during the time period that the stored hue and saturation control signals are brought to their proper levels, that is, for a period of about one second, a video picture having degraded color characteristics is displayed. This picture is particularly objectionable to a viewer.

When the stored control signals are at maximum or minimum values, as when the VIR signal is not received, or the power supply is energized, or a spurious noise signal interferes with a VIR signal, the loop gain of the hue and saturation control circuits becomes relatively low. This means that even large changes in the control signals will result in relatively small changes in the hue and saturation. Consequently, the responsiveness of the hue and saturation control circuits, that is, the speeds at which these circuits respond to changes in the respective control signals, is slow.

OBJECTS OF THE INVENTION

Therefore, it is an object of the present invention to provide improved VIR-responsive color correcting apparatus for use in color video signal receiving apparatus.

Another object of this invention is to provide VIR-controlled color correcting apparatus which overcomes the afore-noted problems attending previously proposed color correcting circuits.

A further object of this invention is to provide VIR-controlled color correcting apparatus wherein hue and/or saturation of the reproduced color picture are brought rapidly to optimum levels when the video signal receiving apparatus which includes such color correcting apparatus is switched from one broadcast channel which does not include a VIR signal to another broadcast channel which does include a VIR signal, or when the power supply for such apparatus is energized, or in the event that a spurious noise signal interferes with a VIR signal.

An additional object of this invention is to provide VIR-controlled color correcting apparatus which includes hue and/or saturation control signal generators, these generators being controlled in the absence of a VIR signal to provide signals of limited levels, thereby improving the response time of the color correcting apparatus once a VIR signal is detected.

Various other objects, advantages and features of the present invention will become readily apparent from the ensuing detailed description, and the novel features will be particularly pointed out in the appended claims.

SUMMARY OF THE INVENTION

In accordance with this invention, color correcting apparatus is provided in color video signal receiving apparatus, the color correcting apparatus being responsive to a VIR signal which has a chrominance reference portion and a luminance reference portion. A level detector detects the level of a demodulated color signal produced by the video signal receiving apparatus during the chrominance reference portion of the VIR signal, and also produces a control signal representing the difference between the detected level and a reference level. A storage circuit stores the control signal; and an adjusting circuit is responsive to the stored control signal for adjusting a predetermined characteristic of the demodulated color signals. A pre-setting circuit is responsive to the absence of a VIR signal from the color video signal for pre-setting the storage circuit to store a predetermined signal when the received color video signal does not include a VIR signal. In a preferred embodiment, the adjusting circuit includes a hue adjustment circuit and a color saturation adjustment circuit. The hue adjustment circuit is controlled as a function of the detected level of a demodulated color difference signal during the chrominance reference portion of the VIR signal; and the color saturation control circuit is controlled as a function of a level-detected simulated color drive signal during the chrominance reference portion.

BRIEF DESCRIPTION OF THE DRAWINGS

The following detailed description, given by way of example, will best be understood in conjunction with the accompanying drawings in which:

FIG. 9 is a block diagram of a preferred embodiment of the color correcting apparatus in accordance with the present invention.

DETAILED DESCRIPTION OF THE PREFERRED EMBODIMENT

Figure 1:
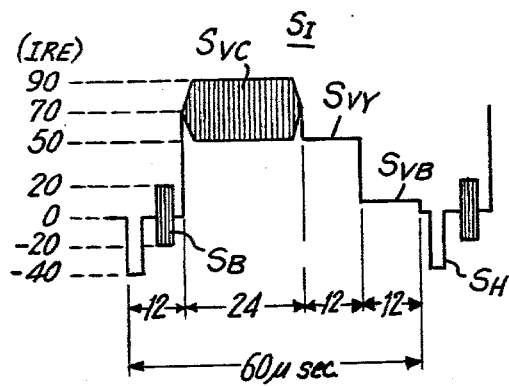
FIG. 1 represents the waveform of a typical VIR signal.

Before proceeding with a discussion of the present invention, reference is made to FIG. 1 which is a waveform representation of a typical VIR signal. As mentioned above, this VIR signal is transmitted during line 19 of the composite television signal. This line interval includes the normal blanking and horizontal synchronizing pulses as well as the color burst signal $S_B$. The levels of the different components shown in FIG. 1 are expressed in IRE units wherein the difference between the blanking level and zero carrier is 100 units. The horizontal synchronizing pulse is shown as a negative pulse of 40 units amplitude, and this pulse is followed by burst signal $S_B$ provided on the blanking or pedestal level of 0 units. As is conventional, burst signal $S_B$ is sinusoidal having a frequency equal to the subcarrier frequency of 3.58 MHz. Typically, the burst signal is present for approximately eight cycles. The peak-to-peak amplitude of burst signal $S_B$ is 40 units and its phase is coincident with the -(B-Y) axis.

Approximately $12\mu$ seconds after the beginning of this VIR signal, the chrominance reference portion $S_{VC}$ is provided, this chrominance reference portion having the same phase as the burst signal, that is, coincident with the -(B-Y) axis, and being formed of the unmodulated subcarrier frequency of 3.58 MHz. The chrominance reference portion is superimposed onto, or "sits" upon, a luminance level of 70 units and exits for a duration of approximately $24\mu$ seconds. Following this chrominance reference portion $S_{VC}$ is a luminance reference portion $S_{VY}$ whose amplitude is 50 units and whose duration is $12\mu$ seconds. The luminance reference portion $S_{VY}$ is followed by a black reference portion $S_{VB}$ having a level of 7.5 units and a duration of $12\mu$ microseconds. The approximate duration from the start of the horizontal synchronizing pulse to the termination of the black reference level is $60\mu$ seconds.

Figure 2:
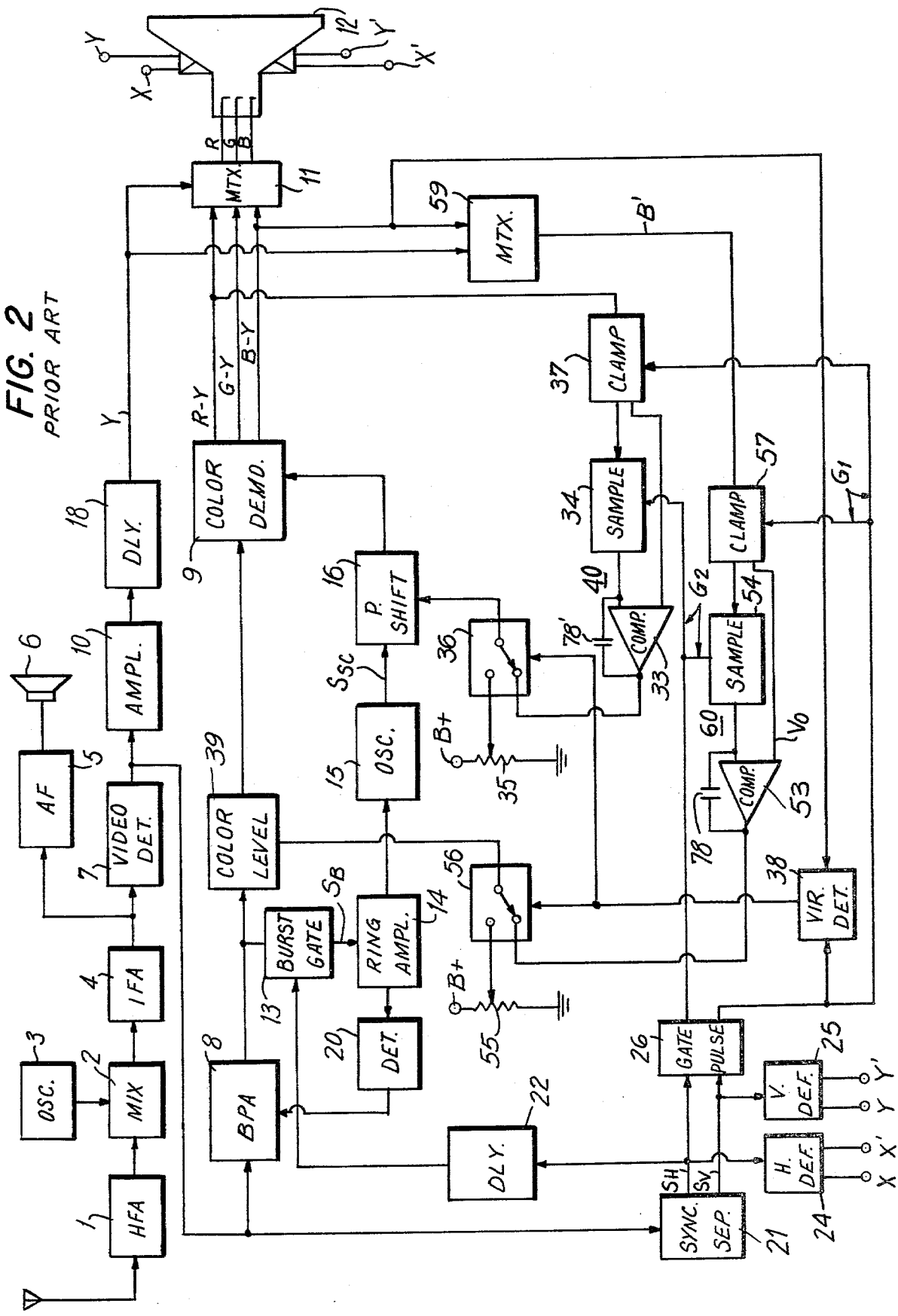
FIG. 2 is a block diagram of our previously proposed color correcting circuit.

Since the VIR signal $S_I$, shown in FIG. 1, is formed of standard, reference portions, these reference portions can be used by color signal receiving apparatus to determine whether there is any undesirable distortion of the received video signal which would interfere with proper, or optimum color characteristics in the reproduced color picture. For example, the chrominance reference portion $S_{VC}$ can be demodulated by the usual color demodulator circuits to produce demodulated signals whose parameters represent hue and/or saturation errors. Suitable hue and saturation control circuits may be provided to automatically modify the characteristics so as to eliminate such errors. One example of video signal receiving apparatus including such color correcting circuits is shown in FIG. 2. The apparatus shown herein includes a high frequency section including a high frequency amplifier 1, a mixer 2 and an intermediate frequency amplifier 4, a luminance component channel including an amplifier 10 and a delay circuit 18, a chrominance component channel including a band pass amplifier 8, a level adjust circuit 39 and a color demodulator 9, and a color correction circuit including a hue control circuit 40 and a saturation control circuit 60. The high frequency section of the video signal receiving apparatus is conventional. Accordingly, high frequency amplifier 1 amplifies the received composite color video signal which is modulated on a transmission carrier. Mixer 2 is supplied with the amplified, received signal and also is supplied with an oscillator 3 so as to produce the intermediate frequency (IF) video signal. This IF video signal is amplified by intermediate frequency amplifier 4 and, as is usual, the audio portion of the television information is derived from the amplified IF signal and demodulated in an audio frequency section 5 for sound reproduction by a loudspeaker 6. In addition, the amplified IF video signal is supplied to a conventional video detector 7, the resultant, detected video signal then being transmitted through the luminance and chrominance channels.

Luminance amplifier 10, which may have a bandwidth confined to the frequency band of the luminance component, is coupled to video detector 7 and is adapted to amplify the luminance component. A delay circuit 18 serves to impart a delay to the luminance component Y so as to equalize the phase of the luminance component with respect to the demodulated color signals, described below. This phase equalization may be needed because the time delay inherent in the chrominance processing elements is larger than the time delay associated with the luminance processing elements. The equalized luminance component Y is supplied to a matrix circuit 11 which is adapted to produce primary color drive signals for modulating the respective beam intensities of a color cathode ray tube 12.

The output of video detector 7 additionally is coupled to band pass amplifier 8, this amplifier having a bandwidth characteristic for amplifying the received chrominance component while attenuating the luminance component. Hence, the output of band pass amplifier 8 includes substantially only the chrominance component together with the burst signal which is superimposed onto the front porch of the horizontal blanking interval. In addition to being coupled to band pass amplifier 8, video detector 7 is coupled to a synchronizing separator circuit 21, the latter including conventional circuitry for recovering horizontal synchronizing signals $S_H$ and vertical synchronizing signals $S_V$ from the received composite color video signal. The horizontal and vertical synchronizing signals are applied to horizontal and vertical deflection circuits 24 and 25, respectively, for producing horizontal deflection drive signals at outputs X, X' and vertical deflection drive signals at outputs Y, Y', respectively. These deflection drive signals are applied to a suitable deflection yoke assembly at the neck of cathode ray tube 12, as is conventional.

Horizontal synchronizing signals $S_H$, separated by synchronizing separator circuit 21, are supplied through a delay circuit 22 to a burst gate 13. The purpose of delay circuit 22 is to supply a gating signal to burst gate 13 which is coincident with the time of occurrence of the burst signal. As shown, burst gate 13 is coupled to band pass amplifier 8 to receive the burst signal therefrom. When burst gate 13 is energized by the delayed horizontal synchronizing signal $S_H$, the received burst signal $S_B$ passes therethrough to a ringing amplifier 14. The ringing amplifier is a conventional circuit for generating a number of cycles of the burst signal, these cycles having the 3.58 MHz burst signal frequency and, in addition, having an amplitude for at least a portion of such cycles which is equal to the amplitude of the received burst signal. An amplitude detector 20 is coupled to the output of ringing amplifier 14 to determine whether the amplitude of the received burst signal, and thus the amplitude of the received chrominance component, is of a predetermined level. Band pass amplifier 8, which may be gain-controlled amplifier, is responsive to the output of level detector 20 for modifying the gain thereof, and thus the level of the chrominance component, in accordance with the level-detected burst signal.

The few cycles of burst signal produced by ringing amplifier 14 are supplied to an oscillator 15 for phase-locking that oscillator to the phase of the received burst signal. Hence, the combination of ringing amplifier 18 and oscillator 15 converts the burst signal pulses to a continuous wave burst signal $S_{SC}$ whose frequency is, of course, equal to the 3.58 MHz subcarrier upon which the color difference signals are modulated in the chrominance component. This local oscillating signal $S_{SC}$ is used to demodulate the chrominance component and, therefore, is supplied as the demodulating subcarrier to color demodulator 9. As shown, the local oscillating signal $S_{SC}$ is supplied through an adjustable phase shifting circuit 16 for the purpose of adjusting the phase of the demodulating signal with respect to the received subcarrier upon which the color difference signals are modulated. An adjustment in the phase of the demodulating subcarrier causes a corresponding adjustment in the hue of the reproduced color picture, as is known.

Color demodulator 9 is conventional and produces respective color difference signals R-Y, G-Y and B-Y, representing the red, green and blue color difference signals, respectively. These color difference signals are supplied to matrix circuit 11, together with the recovered luminance component Y, whereat the luminance component and individual color difference signals are combined in various ratios to derive the respective red, green and blue primary color drive signals R, G and B, respectively. These color drive signals are supplied to respective cathodes of cathode ray tube 12 to modulate the intensities of the red, green and blue electron beams which scan the display surface of the cathode ray tube.

As mentioned above, the color correction circuit included with the apparatus shown in FIG. 2 includes a hue control circuit 40 and a saturation control circuit 60. These circuits are adapted to control the hue and saturation characteristics of the reproduced video picture in accordance with the reference signals included in the VIR signal shown in FIG. 1. Hue control circuit 40 includes a clamp circuit 37, a sampling circuit 34, a comparator 33 and a storage circuit comprised of a capacitor 78'. Clamp circuit 37 is adapted to receive the red color difference signal (R-Y), and to sample this color difference signal during the chrominance reference portion of the VIR signal. That is, clamp circuit 37 is adapted to sample the (R-Y) signal during the 24μ second interval in which the chrominance reference portion $S_{VC}$ of the VIR signal is present during each nineteenth line interval. To this effect, clamp circuit 37 is adapted to receive sampling pulses $G_1$, these pulses being generated by a gate pulse generator 26. The gate pulse generator may include conventional counting and gating circuits, and a vertical synchronizing signal detector. As one example, when a vertical synchronizing interval is detected, the counting circuits included in gate pulse generator 26 may be activated to count successive horizontal synchronizing pulses so as to determine when the nineteenth horizontal synchronizing pulse has been generated. This identifies the nineteenth horizontal line interval. Then, multivibrator circuits, which may be included in the gate pulse generator, will be energized to produce sampling pulses $G_1$ which coincide with the chrominance reference portion $S_{VC}$ of the VIR signal $S_I$ transmitted during each nineteenth line interval. This is best represented by the waveform diagrams shown in FIGS. 3A and 3B. The output of clamp circuit 37 is supplied to one input of comparator 33. As may be appreciated, this output corresponds to the sampled level of the demodulated R-Y signal which is produced during the chrominance reference portion of the VIR signal.

Figure 3A:
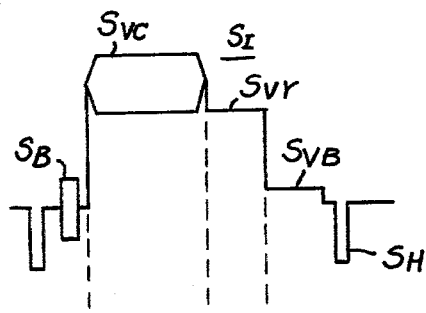
FIGS. 3A–3D are waveform diagrams which are useful in understanding the operation of the circuit shown in FIG. 2.
Figure 3B:
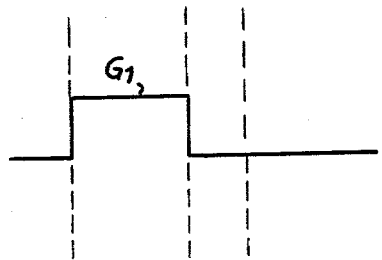
Figure 3C:
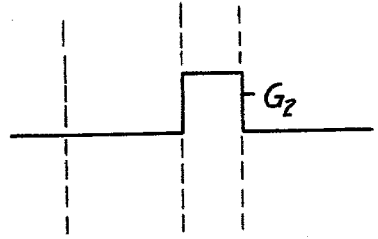

Another output of clamp circuit 37 is coupled to sampling circuit 34, the latter being supplied with sampling pulses $G_2$ which are produced by gate pulse generator 26. Sampling pulses $G_2$ are coincident with the luminance reference portion $S_{VY}$ of the VIR signal, and are produced by multivibrator circuits in a manner similar to the production of sampling pulses $G_1$. The relationship between the VIR signal and sampling pulses $G_1$ and $G_2$ are shown in FIGS. 3A, 3B and 3C, respectively. Thus, sampling circuit 34 is responsive to sampling pulses $G_2$ to sample the output of clamp circuit 37 supplied during the luminance reference portion of the VIR signal. As will be described in greater detail below with respect to the schematic diagram of FIG. 5, clamp 37 supplies sampling circuit 34 with the color difference signal R-Y which is demodulated during the luminance reference portion of the VIR signal. Hence, this color difference signal is sampled and supplied to another input of comparator 33.

Comparator 33 may comprise a subtracting circuit, a differential amplifier, or other circuit conventionally used for comparison of two signals. Thus, the output of comparator 33 is proportional to the difference between the signal supplied thereto by clamp circuit 37 and the signal supplied thereto by sampling circuit 34. That is, the output of comparator 33 is proportional to the difference between the R-Y color difference signal which is demodulated during the chrominance reference portion of the VIR signal and which is demodulated during the immediately following luminance reference portion of the VIR signal. This difference is used as the hue control signal and is stored in storage capacitor 78'. In the embodiment shown in FIG. 2, capacitor 78' is connected between the output of comparator 33 and the input thereto which is supplied by sampling circuit 34. In an alternative embodiment, capacitor 78' merely may be connected between the output of comparator 33 and a reference potential, such as ground. The stored hue control signal is supplied through a switching circuit 36 as a phase control signal for adjustable phase shifting circuit 16.

Saturation control circuit 60 is comprised of a clamp circuit 57, a sampling circuit 54, a comparator 53 and a storage capacitor 78. It is appreciated that these elements are connected in a manner substantially identical to the interconnection of the aforedescribed clamp circuit, sampling circuit, comparator and storage capacitor included in hue control circuit 40. Hence, in the interest of simplification, further detailed description of the color saturation control circuit is not described. However, it should be noted that the input to clamp circuit 57 is a simulated color drive signal. In particular, this simulated color drive signal corresponds to the blue drive signal and here is represented as B'. The simulated blue drive signal B' is produced by a matrix circuit 59 having one input coupled to receive the demodulated B-Y color difference signal and another input coupled to receive the luminance component Y. The reason for providing matrix circuit 59 now will be described. As is conventional in NTSC transmissions, the respective color difference signals which are modulated onto the subcarrier for transmission are attenuated to different degrees. Hence, at the receiving apparatus, the respective color difference signals must be amplified, also to correspondingly different degrees. Thus, the R-Y signal is amplified by a factor of 1.14 and the B-Y signal is amplified by the factor 2.03. This amplification function is provided in color demodulator 9. Because of such amplifications, the amplitude of the B-Y signal which is demodulated from the chrominance reference portion $S_{VC}$ of the VIR signal may have a level which cannot be used easily for controlling color saturation. This can be explained with respect to the waveforms shown in FIGS. 4A–4D. Let it be assumed that the received VIR signal $S_I$ appears as shown by the solid curve in FIG. 4A. Color demodulator 9 is responsive to the chrominance reference portion $S_{VC}$ of VIR signal $S_I$ to produce the B-Y color difference signal shown by the solid line in FIG. 4B. This B-Y color difference signal has its amplitude multiplied by the factor 2.03, as is conventional, by the color demodulator. This multiplying factor is appreciated by comparing the waveform shown in FIG. 4B to that shown in FIG. 4A.

Figure 4A:
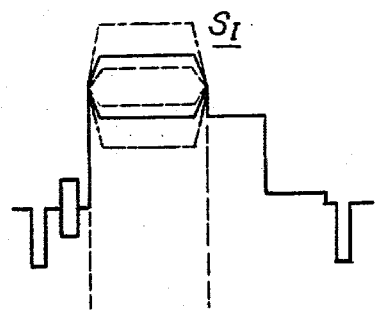
FIGS. 4A–4D are waveform diagrams which also are useful in understanding the operation of the circuit shown in FIG. 2.
Figure 4B:
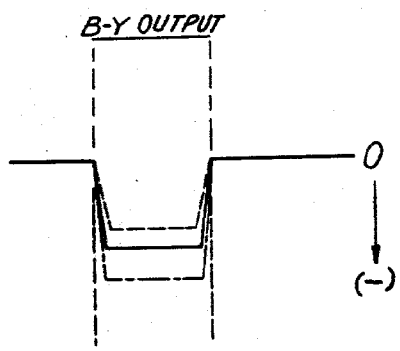
Figure 4C:
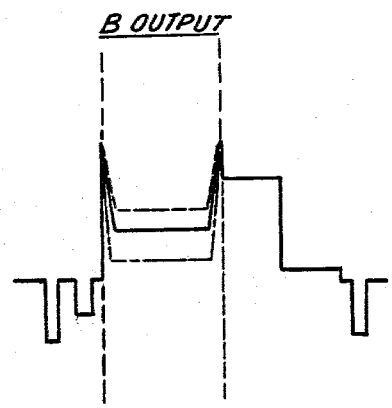
Figure 4D:
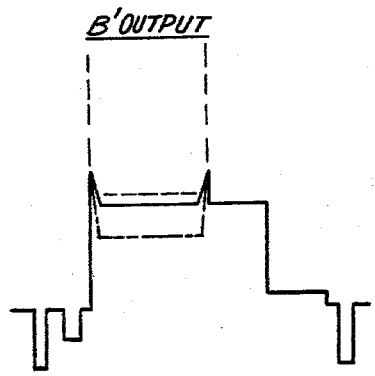

With the B-Y color difference signal produced by color demodulator 9, as shown in FIG. 4B, the blue drive signal B produced by matrix circuit 11 when the B-Y color difference signal is combined with the luminance component Y is shown by the solid line in FIG. 4C. The blue drive signal (FIG. 4C) produced during the chrominance reference portion of the received VIR signal differs in amplitude from the blue drive signal which is produced during the immediately following luminance reference portion of the VIR signal. However, since the amplitude of the chrominance reference portion of the VIR signal is equal to the amplitude of the burst signal $S_B$, and since the chrominance to luminance ratio of the chrominance reference portion $S_{VC}$ is particularly selected, it is possible that the blue color difference signal B-Y and the luminance component Y can be combined, or matrixed, such that the resultant drive signal, referred to hereinafter as a simulated blue drive signal B', will have the same amplitude during the chrominance reference portion $S_{VC}$ and during the immediately following luminance reference portion $S_{VY}$. Matrix circuit 59 combines the blue color difference signal and the luminance component in this manner so as to produce the simulated blue drive signal B' shown by the solid line in FIG. 4D.

In the event that the level of the chrominance reference portion $S_{VC}$ of the VIR signal supplied to color demodulator 9 varies from the desired, or optimum level represented by the solid curve in FIG. 4A, such as if the chrominance reference portion decreases in amplitude, depicted by the broken curve, or if the chrominance reference portion increases in amplitude, depicted by the chain line curve, a corresponding change would appear in the B-Y color difference signal (shown by the broken line and chain line in FIG. 4B), and in the blue drive signal B (shown as the broken line and chain line in FIG. 4C). A similar change in the level of the simulated blue drive signal B' will be present, as shown by the broken line and chain line in FIG. 4D. Although the level of the simulated blue drive signal B' will change when the chrominance reference portion of the VIR signal is demodulated, the level of the simulated blue drive signal when the luminance reference portion of the VIR signal is received remains constant. Hence, the change in the level of the chrominance reference portion of the VIR signal can be detected by comparing the level of the simulated blue drive signal during the chrominance reference portion with the level of the simulated blue drive signal during the luminance reference portion. This operation is performed by color saturation control circuit 60.

Returning to the color correction circuit shown in FIG. 2, the hue control signal produced by hue control circuit 40 and the color saturation control signal produced by saturation control circuit 60 are supplied to adjustable phase shifter 16 and to level adjusting circuit 39, respectively, only if the received video signal includes a VIR signal. In the absence of a VIR signal, manually adjustable control signals are supplied to the phase shifter and to the level adjusting circuit. To this effect, switching circuits 36 and 56 are provided, both of these circuits being coupled to and controlled by VIR detector 38. Although these switching circuits preferably are formed of solid state switching elements, they are depicted herein as electro-mechanical changeover switches for the purpose of clarity. Thus, switching circuit 36 includes one stationary contact connected to storage capacitor 78' for receiving the hue control signal, and another stationary contact connected to a manually adjustable circuit, such as a potentiometer 35, for receiving a manual control signal. The movable contact of switching circuit 36 is selectively engageable with either of its stationary contacts under the control of VIR detector 38, and this movable contact is coupled to the control terminal of adjustable phase shifter 16. Switching circuit 56 may be of similar construction and includes one stationary contact connected to storage capacitor 78 to receive the saturation control signal therefrom, another stationary contact connected to a potentiometer 55 and a movable contact connected to level adjusting circuit 39.

As appears from its designation, VIR detector 38 is adapted to detect when the received video signal includes a VIR signal. In one embodiment of a VIR detector, the presence of a VIR signal is determined by ascertaining whether the demodulated B-Y color difference signal during the chrominance reference portion exceeds a threshold level. Accordingly, VIR detector 38 may include a sampling circuit and a comparator, the sampling circuit connected to receive the B-Y color difference signal and gating pulses $G_1$. In this manner, the demodulated B-Y color difference signal produced during each nineteenth line interval is sampled at the time that a chrominance reference portion is expected. The comparator serves to compare this sampled level with a predetermined threshold level and to produce an output signal in the event that the sampled level exceeds this threshold level.

In operation, gate pulse generator 26 produces gating pulses $G_1$ and $G_2$ (FIGS. 3B and 3C) during each nineteenth line interval in response to the separated vertical and horizontal synchronizing signals $S_V$ and $S_H$. During each nineteenth line interval, color demodulator 9 produces the red and blue color difference signals R-Y and B-Y, respectively. Gating pulse $G_1$ is supplied to clamp circuit 37 which samples the R-Y color difference signal during the chrominance reference portion in the nineteenth line interval, and the sampled R-Y level is supplied to one input of comparator 33. Immediately following gating pulse $G_2$ is supplied to sampling circuit 34 to sample the R-Y signal at this time during the nineteenth line interval. Comparator 33 compares the sampled levels, and any difference therebetween results in a hue control signal which is stored in storage capacitor 78'. Of course, in the event that a VIR signal is not received during the nineteenth line interval, the signal stored in capacitor 78' may be any arbitrary value, and may exhibit a maximum or minimum value to which capacitor 78' can be charged.

A similar operation is performed by saturation control circuit 60, with the exception that the signal level which is sampled in clamp circuit 57 and in sampling circuit 54 is the aforedescribed simulated blue drive signal B'. Here too, in the absence of a VIR signal during the nineteenth line interval, the signal stored in capacitor 78 may have any arbitrary value, and may exhibit a maximum or minimum value.

If a VIR signal is detected by VIR detector 38, switching circuits 36 and 56 are conditioned to supply the signals stored in capacitors 78' and 78, respectively, to adjustable phase shifter 16 and to level adjusting circuit 39. In the absence of a VIR signal, VIR detector 38 conditions switching circuits 36 and 56 to supply manually adjustable control signals to the phase shifter and to the level adjusting circuit.

If there is any shift in the hue of the reproduced video picture, this shift results in a change in the demodulated R-Y color difference signal during the chrominance reference portion of the VIR signal with respect to the R-Y signal produced during the luminance reference portion of the VIR signal. Hence, comparator 33 produces a hue control signal in response to this change, and this hue control signal is stored in capacitor 78' and used to adjust the phase of the local oscillating signal which demodulates the chrominance component of the color video signal, thereby restoring the hue of the reproduced video picture to its desired characteristic. Similarly, if there is a change or shift in the color saturation of the reproduced video picture, a corresponding change is produced in the B-Y color difference signal during the chrominance reference portion of the VIR signal. Consequently, the level of the simulated blue drive signal B' is changed during the chrominance reference portion, but not during the luminance reference portion, resulting in a saturation control signal produced by comparator 53 and stored in capacitor 78. This control signal is applied to level adjusting circuit 39 to modify the level of the chrominance component, thereby restoring the reproduced video picture to its desired color saturation characteristic.

Figure 5:
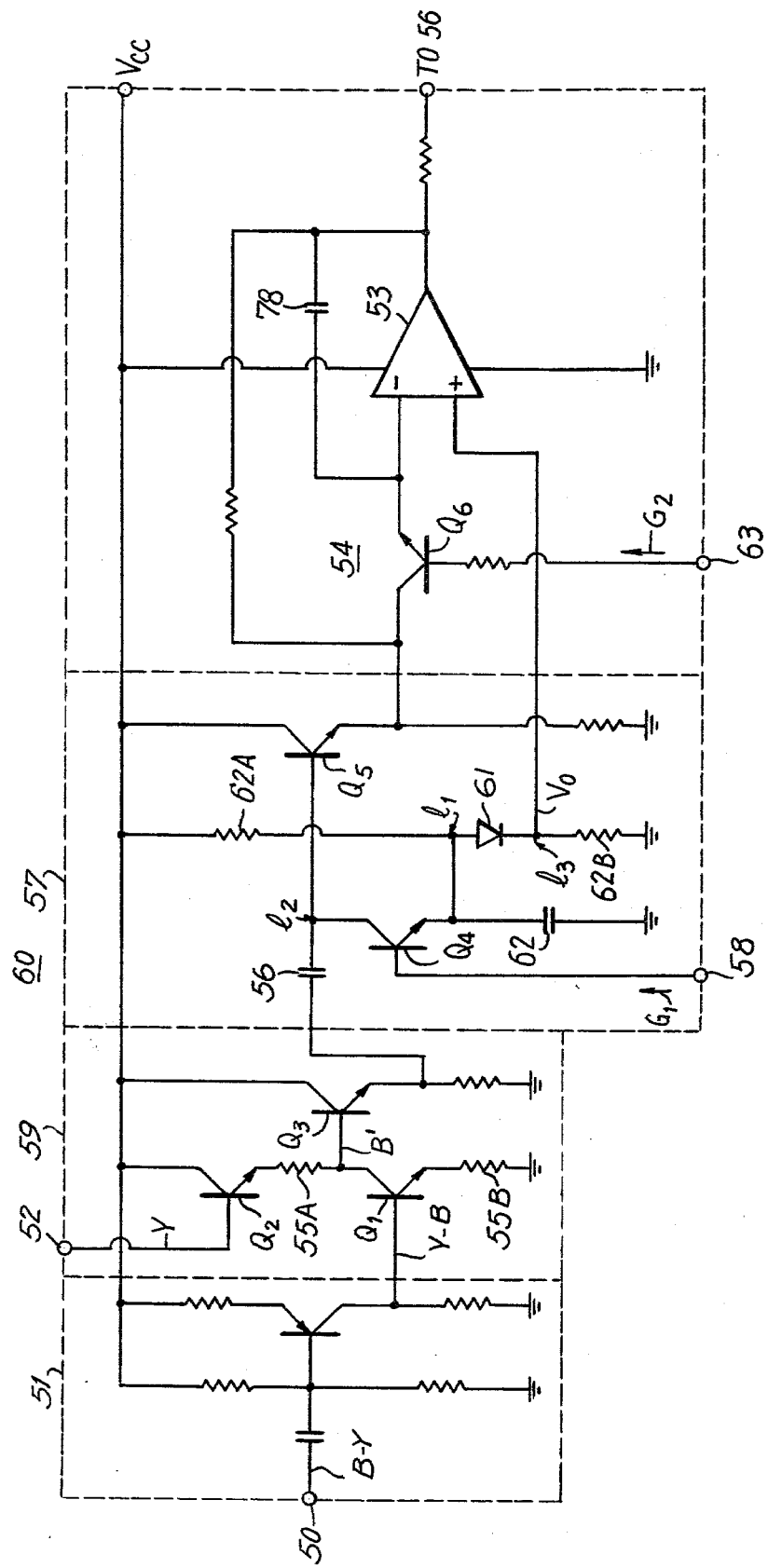
FIG. 5 is a schematic diagram of certain components included in the circuit shown in FIG. 2.

A schematic representation of saturation control circuit 60, together with matrix circuit 59, now will be described with reference to FIG. 5. Matrix circuit 59 is shown as being connected to an input stage 51 having an input terminal 50 adapted to receive the demodulated blue color difference signal B-Y. Input stage 51 merely includes a transistor for the purpose of amplifying and inverting the B-Y signal. Matrix circuit 59 itself includes transistors $Q_1$ and $Q_2$ connected in cascode, or summing relation, with the output of these transistors connected to an emitter-follower transistor $Q_3$. In particular, the base electrode of transistor $Q_1$ receives the inverted B-Y signal, and the base electrode of transistor $Q_2$ receives the luminance component Y which is supplied thereto at input terminal 52. A resistor 55A connects the emitter electrode of transistor $Q_2$ to the collector electrode of transistor $Q_1$, and the latter transistor additionally includes an emitter resistor 55B. The gain of transistors $Q_1$ and $Q_2$ is approximately equal to the ratio of resistances of resistor 55A to resistor 55B. Thus, the combined luminance component Y and inverted B-Y color difference signal produces the simulated blue drive signal B' whose level is determined essentially by the resistance ratio of resistors 55A and 55B. This simulated blue drive signal B' is supplied through emitter-follower transistor $Q_3$, which acts as a buffer amplifier, to clamp circuit 57.

Clamp circuit 57 includes transistors $Q_4$ and $Q_5$, a diode 61 and a capacitor 62. Transistor $Q_4$ has its collector electrode connected to junction $l_2$ which is capacitively coupled via a capacitor 56 to the output of buffer transistor $Q_3$. The emitter electrode of transistor $Q_4$ is connected to a storage capacitor 62 which, in turn, is connected to ground. The emitter electrode of this transistor also is connected to a junction $l_1$ which, in turn, is coupled via diode 61 to the non-inverting input of comparator 53, shown herein as a subtracting operational amplifier. Junction $l_1$ also is connected in the voltage divider circuit formed of resistors 62A and 62B which are connected in series across a voltage supply terminal $V_{cc}$. The base electrode of transistor $Q_4$ is connected to a terminal 58 for receiving gating pulses $G_1$.

Junction $l_2$ additionally is connected via the base-emitter circuit of an emitter-follower buffer transistor $Q_5$ to sampling circuit 54. As shown herein, the sampling circuit is formed of the collector-emitter circuit of a transistor $Q_6$ whose base electrode is connected to an input terminal 63 for receiving gating pulses $G_2$. The output of transistor $Q_6$, that is, the emitter electrode thereof, is connected to the inverting input of comparator 53.

Although comparator 53 is shown herein as a subtracting operational amplifier, it is appreciated that any other suitable comparator circuits can be used. For example, the comparator may comprise a differential amplifier. The output of comparator 53 is connected to capacitor 78 which, as shown in FIG. 5, is connected between the output of the comparator and the inverting input thereof. As an alternative, capacitor 78 may be connected between the output of comparator 53 and ground potential. The signal which is stored in capacitor 78 is supplied to switching circuit 56, as shown in FIG. 2 and as indicated in FIG. 5.

In operation, matrix circuit 59 produces the simulated blue drive signal B' which is supplied by buffer transistor $Q_3$ and capacitor 56 to junction $l_2$. During the chrominance reference portion of the received VIR signal, gating pulse $G_1$ is produced which renders transistor $Q_4$ conductive, thereby charging capacitor 62 to the level of the simulated blue drive signal B' which is applied to junction $l_2$. Stated otherwise, gating pulse $G_1$ is used by transistor $Q_4$ to sample the level of the simulated blue drive signal during the chrominance reference portion of the VIR signal, and this sampled level is stored across capacitor 62. This stored, sampled level also is supplied through diode 61 to junction l₃ which is connected to the non-inverting input of comparator 53. At the conclusion of the chrominance reference portion interval, gating pulse $G_1$ terminates and transistor $Q_4$ is rendered non-conductive. Hence, the voltage at the junction $l_2$ is enabled to charge to the level of the simulated blue drive signal B' supplied thereto during the luminance reference portion of the VIR signal. That is, and with reference to FIG. 4D, during the duration of gating pulse $G_1$, the simulated B' drive signal, less the diode voltage drop of diode 61, is supplied to the non-inverting input of comparator 53. During the luminance reference portion of the VIR signal, the simulated blue drive signal B' is supplied by buffer transistor $Q_5$ to sampling transistor $Q_6$. The gating pulse $G_2$ now applied to sampling transistor $Q_6$ couples the simulated blue drive signal, less the base-emitter voltage of transistor $Q_5$, to the inverting input of comparator 53. Hence, the simulated blue drive signal which is produced during the chrominance reference portion and which is stored across capacitor 62 and supplied to the non-inverting input of comparator 53 is compared to the simulated blue drive signal which is produced during the immediately following luminance reference portion of the VIR signal and which is supplied by transistors $Q_5$ and $Q_6$ to the inverting input of comparator 53. Any difference between these compared signals is used to produce the saturation control signal which, in turn, is stored in capacitor 78 and which is supplied through switching circuit 56 to level adjusting circuit 39.

In view of the foregoing explanation, it is appreciated that diode 61 is used to compensate for the base-emitter voltage drop $V_{be}$ across transistor $Q_5$. That is, the diode voltage drop across diode 61 is equal to the base-emitter voltage drop across transistor $Q_5$, thereby compensating for any level shifting in the simulated blue drive signal which is applied to comparator 53.

Referring to the waveform diagrams shown in FIGS. 6A–6E, let it be assumed that the chrominance reference portion of the VIR signal which is received by the color demodulator is of the proper level. Consequently, the level of the simulated blue drive signal B' will be $E_o$ (FIG. 6E), and this level is applied to the non-inverting input of comparator 53. The simulated blue drive signal produced during the immediately following luminance reference portion also will be equal to $E_o$, and this level is applied to the inverting input of comparator 53 by transistors $Q_5$ and $Q_6$. Thus, no change in the saturation control voltage is produced, and no adjustment is made to the level adjusting circuit.

Figure 6A:
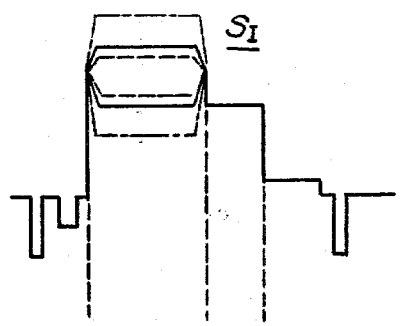
FIGS. 6A–6E are waveform diagrams which are useful in explaining the operation of the circuit shown in FIG. 5.
Figure 6B:
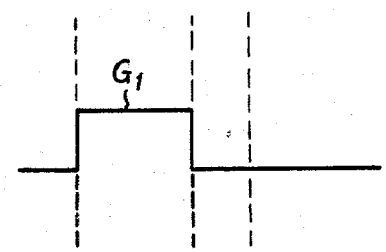
Figure 6C:
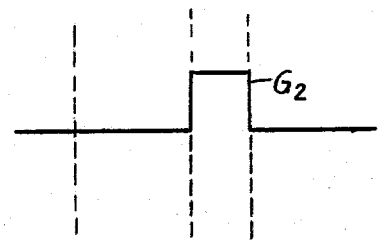
Figure 6D:
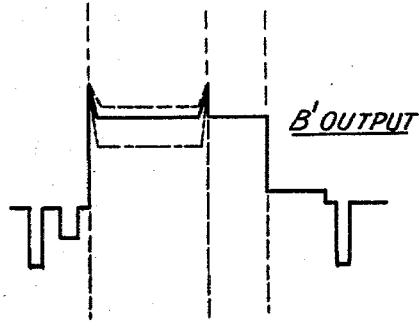
Figure 6E:
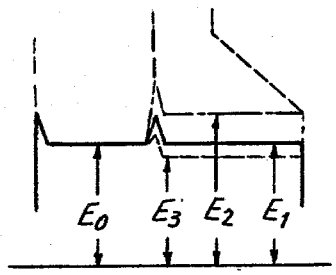

If the level of the chrominance reference portion is reduced, as represented by the broken curve in FIG. 6A, then the resultant simulated blue drive signal B' will have the level $E_3$ shown in FIG. 6E. Of course, during the immediately following luminance reference portion of the VIR signal, the simulated blue drive signal will have the level $E_o$. Since the level $E_3$ supplied to the non-inverting input of comparator 53 now differs from the level $E_o$ supplied to the inverting input thereof, the comparator will produce a changed saturation control signal which, in turn, controls the adjusting circuit to modify the level of the chrominance component supplied to the color demodulator.

Similarly, if the level of the chrominance reference portion of the VIR signal increases, as represented by the chain line in FIG. 6A, the level of the simulated blue drive signal B' will be equal to $E_2$. Since the level of the simulated blue drive signal during the luminance reference portion remains at $E_o$, comparator 53 produces a control signal proportional to the difference between $E_2$ and $E_o$, this control signal being used by the level adjusting circuit to modify the chrominance component level supplied to the color demodulator. Consequently, the information provided in the VIR signal is used to maintain the color saturation characteristic of the reproduced video picture at its optimum level.

Hue control circuit 40 may be of similar construction as color saturation control circuit 60, and functions in an analogous manner to maintain the hue characteristic of the reproduced video picture at its optimum level. Thus, hue control circuit 40 functions to detect any shift in phase of the chrominance reference portion $S_{VC}$ of the VIR signal relative to the burst signal $S_B$. As is understood, in the absence of a phase differential therebetween, the R-Y color difference signal produced during the chrominance reference portion is equal to the R-Y signal produced during the luminance reference portion. However, if there is a phase differential between the chrominance reference portion and the burst signal, then the R-Y signal produced during the chrominance reference portion differs from the R-Y signal produced during the luminance reference portion. This level difference is used to adjust the phase of the local oscillator demodulating signal in a direction which eliminates this phase shift.

As mentioned above, and as is apparent from FIGS. 2 and 5, the respective hue and saturation control circuits are operative during each nineteenth line interval irrespective of whether a VIR signal is present. Of course, the hue and saturation control signals produced by these circuits are not utilized in the absence of a VIR signal. Consequently, signals are stored across capacitors 78 and 78' even in the absence of a VIR signal. However, since the R-Y color difference signal produced by color demodulator 9 and the simulated blue drive signal B' produced by matrix circuit 59 during the nineteenth line interval of a video signal may assume virtually any value in the absence of a VIR signal, the signals stored by capacitors 78 and 78' are unpredictable and, moreover, may vary between maximum and minimum values. This randomness in the value of the stored signals also occurs in the event that a video signal containing a VIR signal is received, but a spurious noise signal interferes with the VIR signal during the nineteenth line interval. Now, let it be assumed that the instantaneous signals stored across capacitors 78 and 78' are random at the very instant that the video signal receiving apparatus receives a proper VIR signal. This is the condition that will exist if the video signal receiving apparatus is switched from receiving one broadcast channel which does not include a VIR signal (or which is provided with a spurious noise signal to interfere with a VIR signal), or when the power supply for the signal receiving apparatus first is energized. It is appreciated that, in the presence of a proper VIR signal, the signals stored across capacitors 78 and 78' tend to assume predetermined values, such as a control signal $V_o$ which corresponds to optimum hue and/or saturation characteristics. Depending upon the values of the signals stored across capacitors 78 and 78' at the instant that a correct VIR signal is received, a substantial period of time may be required in order for such stored signals to be modified until the desired control signal levels $V_o$ are attained. If a maximum or minimum voltage is stored across the capacitors at the instant that the correct VIR signal is received, this time delay may be on the order of one or even a few seconds. That is, the color characteristics of the displayed video picture will be degraded for this time delay, i.e., until the saturation and hue characteristics can be corrected under the control of the received VIR signal. Stated otherwise, the hue and saturation control circuits exhibit a sufficiently high response time such that they cannot accurately follow large or abrupt changes in the control signals stored across capacitors 78 and 78'.

Figure 7:
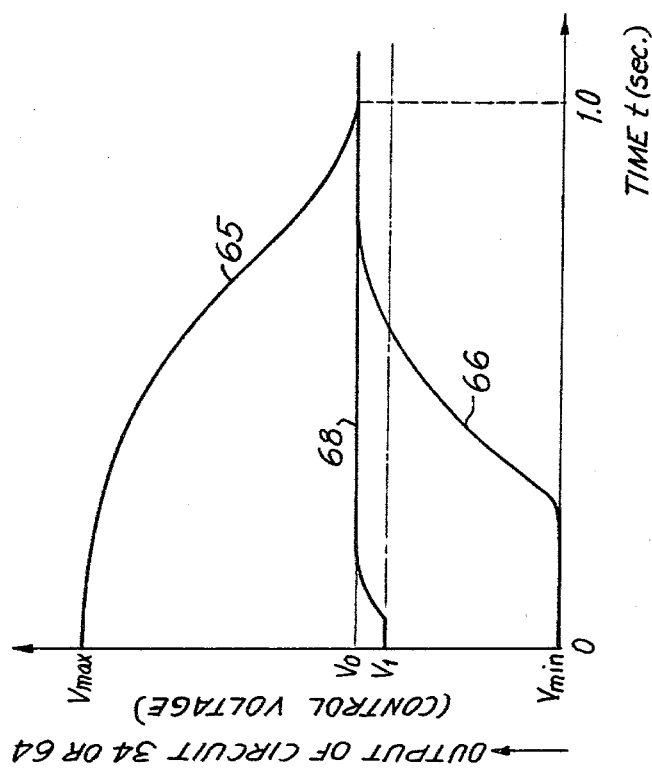

Graphical representations of the foregoing condition are illustrated in FIG. 7 wherein the abscissa represents time and the ordinate represents the control voltage $V_c$ produced either by hue control circuit 40 or saturation control circuit 60. The value of the control voltage $V_c$ at time 0 represents the level of the control signal stored across capacitor 78 or 78' at the instant that a VIR signal first is received. Thus, time 0 corresponds to the time that the video signal receiving apparatus is switched to a broadcast channel which includes a correct VIR signal or the time at which the apparatus first is energized. If this stored signal has a value $V_{max}$, then this signal is changed along curve 65 until the stored signal reaches the desired level $V_o$ corresponding to an optimum hue and/or saturation color characteristic. If the stored signal is at a minimum voltage level $V_{min}$, then this signal is changed along curve 66 until the optimum control signal level $V_o$ is attained. It is appreciated that this time delay required for the stored signal to reach the optimum control signal level is on the order of about one second.

Let it be assumed that characteristic curves 65 and 66, shown in FIG. 7, represent the saturation control voltage which is applied to level adjusting circuit 39. Hence, as the control voltage $V_c$ varies, the level $e_o$ of the chrominance component supplied to color demodulator 9 likewise varies. This relationship between the chrominance level $e_o$ at the output of the level adqusting circuit and the control voltage $V_c$ supplied thereto is graphically represented by the characteristic curve 67 shown in FIG. 8. This characteristic curve indicates that, at substantial portions of the operation thereof, the level adjusting circuit, which may be a gain-controlled amplifier, is not linear. That is, the relationship between the output signal and control input signal to this gain-controlled amplifier is non-linear.

The control sensitivity of such a gain-controlled amplifier is represented as the change in the output signal with respect to the change in the control input signal. Curve 67 represents that this control sensitivity is not linear; and since the loop gain of the saturation control circuit 30 is a function of the control sensitivity of the gain-controlled amplifier, this loop gain also is not linear. As represented by curve 67, the loop gain of the saturation control circuit is relatively low between points $C_1$ and $C_2$ and also between points $C_5$ and $C_6$. That is, only a very small change in the output signal $e_o$ is produced in response to a large change in the input control signal $V_c$. However, the loop gain of the saturation control circuit is relatively higher between points $C_2$ and $C_3$, $C_3$ and $C_4$, and $C_4$ and $C_5$. Also, since the responsiveness, or response time, of the gain-controlled amplifier is, to a large extent, determined by the loop gain of the saturation control circuit, it is appreciated that this response time is relatively slow between points $C_1$ and $C_2$ and between points $C_5$ and $C_6$. The loop gain and control sensitivity are particularly low, and the response time is particularly slow when the signal initially stored across capacitor 78 is at a maximum or minimum level at the instant that a proper VIR signal is received.

An analogous explanation is applicable to the operation of hue control circuit 40. That is, if a maximum or minimum signal is stored across capacitor 78' at the time that a proper VIR signal is received, a relatively long time delay is required until the control signal reaches its optimum value $V_o$ corresponding to an optimum hue characteristic in the reproduced video picture.

In accordance with the present invention, this time delay, or transient period, is minimized. That is, the present invention substantially reduces the time delay from the time that a VIR signal is received to the time that the color characteristics of the reproduced video picture attain optimum levels. Hence, by the present invention, any instability or deterioration in the reproduced video picture when the video signal receiving apparatus is switched from one broadcast channel which does not include a VIR signal to another channel which does include a VIR signal, or when a spurious noise signal interferes with a received VIR signal, or when the receiving apparatus first is energized, is substantially reduced such that this instability or deterioration is not perceived by a viewer. One embodiment of a VIR-controlled color correction circuit for use with color video signal receiving apparatus is shown in FIG. 9. The apparatus of FIG. 9 is similar in many respects to the aforedescribed apparatus shown in FIG. 2, and like components are identified by like reference numerals. In the FIG. 9 embodiment, the output of VIR detector 70, in addition to being supplied as a switch control signal to switching circuits 36 and 56 also is used as a control signal to pre-set the signals stored across capacitors 78 and 78' to predetermined signal levels. As will be described in greater detail hereinbelow with respect to the schematic diagram of FIG. 10, capacitors 78 and 78' are pre-set to store predetermined signal levels when VIR detector 70 detects the absence of a VIR signal from the received video signal. Although the VIR detector may be identical to VIR detector 38 shown in FIG. 2, the embodiment of FIG. 9 shows that VIR detector 70 may be responsive to the detected luminance signal Y for the purpose of determining the presence or absence of the VIR signal.

The elements included in the chrominance channel of the embodiment shown in FIG. 9 also include a color killer circuit 76 and a color killer amplifier 77, these circuit components being of a nature which is conventional in color video signal processing apparatus. Color killer circuit 76 is coupled to level detector 20 and is triggerable to produce a color killer signal in the event that level detector 20 senses that the amplitude of the received burst signal is less than a predetermined threshold level, or color killer level. That is, it is assumed that if the received burst signal level is less than this threshold level, then an accurate color picture may not be reproduced. In that event, it is preferred to inhibit the operation of color demodulator 9. Similarly, in the event that a monochrome video signal is received, spurious signals may be supplied to and demodulated by color demodulator 9. In that event, it is preferred to inhibit the operation of the color demodulator. If color killer circuit 76 produces a color killer signal, representing that a color video picture should not be reproduced, this color killer signal is supplied as a gain controlling signal to amplifier 77 to reduce the gain of that amplifier substantially to zero. Hence, in the absence of a proper burst signal, any signal which is supplied to color demodulator 9 is substantially attenuated, or reduced to zero, thereby effectively inhibiting the operation of the color demodulator.

Figure 3D:
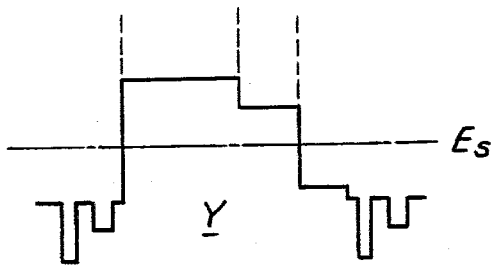

Since VIR detector 70 senses the presence or absence of a VIR signal on the basis of the level of the luminance signal Y (FIG. 3D represents the level of the luminance signal Y with respect to a threshold level $E_S$), and since the level of the luminance signal may be high enough to trigger the VIR detector in the absence of a proper VIR signal, the color killer signal produced by color killer circuit 76 additionally is applied to the VIR detector for the purpose of causing the detector to indicate the absence of a VIR signal.

The remainder of the video signal receiving apparatus and color correction apparatus shown in FIG. 9 is substantially similar to the corresponding elments shown in FIG. 2.

Figure 10:
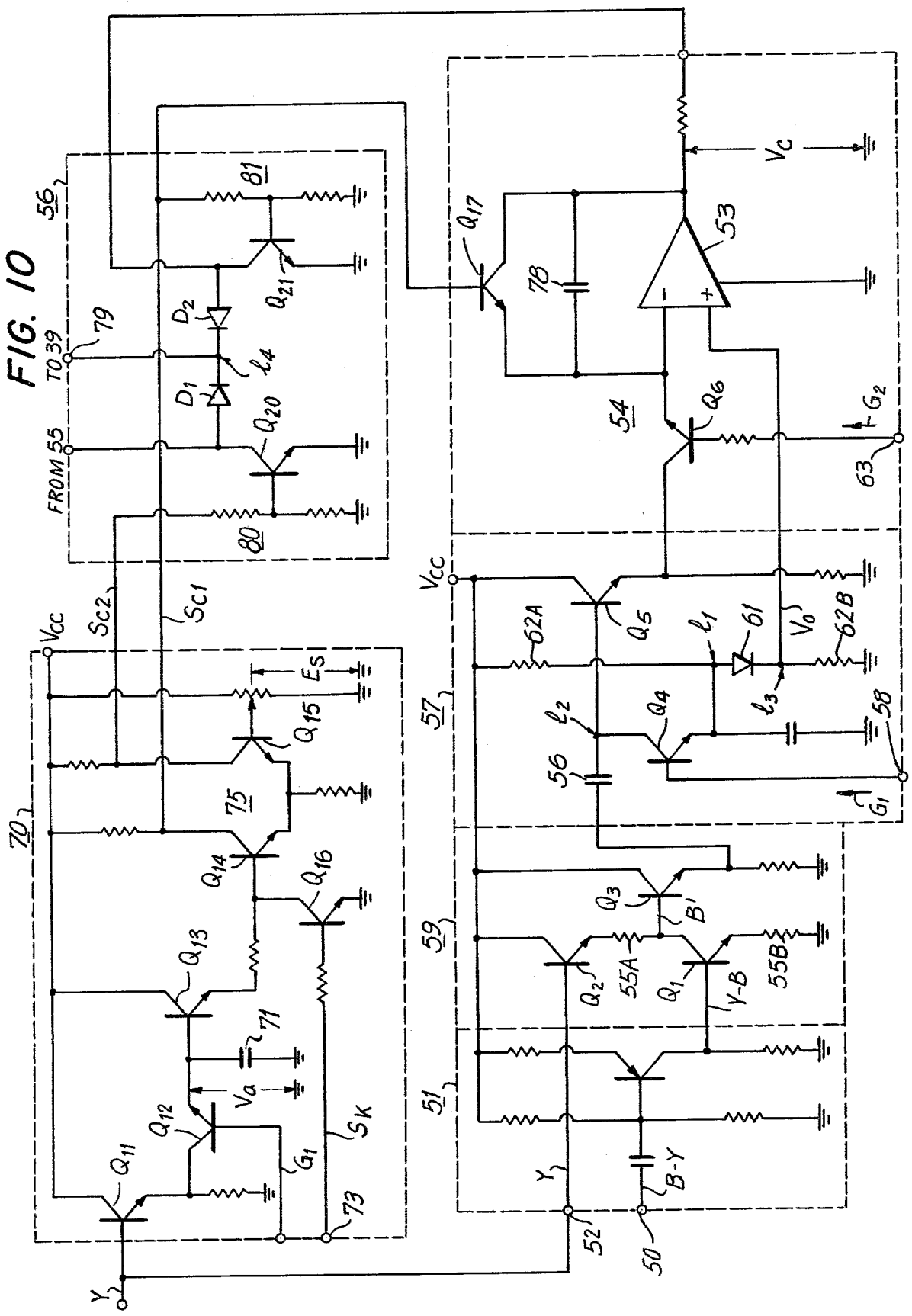
FIG. 10 is a schematic diagram of various components included in the color correcting apparatus shown in FIG. 9.

A schematic representation of VIR detector 70 and switching circuit 56 is shown in FIG. 10. Also shown therein is a schematic diagram of matrix circuit 59 and color saturation control circuit 60. VIR detector 70 includes a sampling circuit formed of transistors $Q_{11}$, $Q_{12}$ and $Q_{13}$ and a comparator 75 formed of transistors $Q_{14}$ and $Q_{15}$ connected in differential amplifier configuration. Transistor $Q_{11}$ is connected as an emitter-follower buffer transistor whose base electrode is supplied with luminance component Y. Transistor $Q_{12}$ is connected as a switching or sampling transistor whose collector-emitter circuit is connected in series between the emitter output of buffer transistor $Q_{11}$ and a storage capacitor 71, the latter being connected to ground potential. The base electrode of switching or sampling transistor $Q_{12}$ is connected to gate pulse generator 26 to receive gating pulses $G_1$. The output of capacitor 71 is coupled through emitter-follower buffer transistor $Q_{13}$ to one input of the differential amplifier comprising comparator 75.

As shown, transistor $Q_{14}$ has its base electrode connected to receive the sampled output of buffer transistor $Q_{13}$. Transistor $Q_{14}$ is connected in differential amplifier configuration with transistor $Q_{15}$, the base electrode of this latter transistor being connected to a voltage divider so as to receive a threshold reference level $E_s$ which is derived from the operating voltage $V_{cc}$.

In operation, the luminance signal Y derived from video detector 7 is supplied through buffer transistor $Q_{11}$ to sampling or switching transistor $Q_{12}$. Gating pulse $G_1$, which is produced by gate pulse generator 26 during nineteenth line interval, renders transistor $Q_{12}$ conductive so as to charge capacitor 71 with a level substantially equal to the level of luminance signal Y which is applied to transistor $Q_{11}$ during the chrominance reference portion of the received VIR signal. This sampled level is supplied through buffer transistor $Q_{13}$ to comparator 75 whereat it is compared to the threshold level $E_s$. It is expected that, in the absence of a VIR signal, the level of the luminance signal Y sampled by gating pulse $G_1$ is less than the threshold level $E_s$. Hence, in the absence of a VIR signal, transistor $Q_{15}$ is conductive and transistor $Q_{14}$ is non-conductive. The collector voltage $S_{C1}$ of transistor $Q_{14}$ thus is higher or more positive than the collector voltage $S_{C2}$ of transistor $Q_{15}$. As will be discussed below, when collector voltage $S_{C1}$ is at a relatively higher level, representing the absence of a VIR signal, switching circuit 56 is conditioned to supply the manually adjustable signal derived from potentionmeter 55 to level adjusting circuit 39. Also, and as will be described, when collector voltage $S_{C1}$ is at a relatively high level, capacitor 78 is pre-set to a predetermined signal level.

If a VIR signal is present, the level of the sampled luminance signal which is applied to comparator 75 will exceed the threshold level $F_s$ (FIG. 3D), thereby rendering transistor $Q_{14}$ conductive and transistor $Q_{15}$ non-conductive. Hence, the collector voltage $S_{C1}$ of transistor $Q_{14}$ is relatively low and the collector voltage $S_{C2}$ of transistor $Q_{15}$ is relatively high, or more positive. The relatively high level of collector voltage $S_{C2}$ conditions switching circuit 56 to supply the control signal $V_C$ produced by comparator 53 to level adjusting circuit 39. Also, the relatively low collector voltage $S_{C1}$ inhibits the aforementioned pre-set operation for capacitor 78.

If desired, and as indicated by FIG. 3D, the level of luminance signal Y may be sampled in transistor $Q_{12}$ by gating pulse $G_2$.

It is possible that, in the absence of a proper chrominance component in the received video signal, the luminance signal Y during the nineteenth line interval, and as sampled by gating pulse $G_1$, may be sufficiently large to be interpreted by VIR detector 70 as representing the presence of a VIR signal. However, in the absence of a proper chrominance component, such as when a monochrome video signal is received or when the level of the chrominance component is too low, color killer circuit 76 produces a color killer signal $S_k$ which is applied to terminal 73 of VIR detector 70. A clamping transistor $Q_{16}$ has its base electrode connected to terminal 73 and its collector-emitter circuit connected in shunt between the base electrode of transistor $Q_{14}$ and ground potential. Thus, even if the sampled luminance component is of a high enough level so as to erroneously simulate the presence of a VIR signal, color killer signal $S_k$ renders transistor $Q_{16}$ conductive so as to clamp the base electrode of transistor $Q_{14}$ to a relatively low level, thereby rendering transistor $Q_{14}$ non-conductive. That is, the presence of color killer signal $S_k$ conditions comparator 75 to simulate the absence of a VIR signal, whereby the collector voltage $S_{C1}$ is made relatively high while the collector voltage $S_{C2}$ is made relatively low.

Switching circuit 56 is illustrated as comprising one input terminal coupled to potentiometer 55 and another input terminal coupled to the output of comparator 53 to receive the saturation control signal $V_C$. A diode $D_1$ couples potentiometer 55 to an output terminal 79, this output terminal being connected to the gain control input of level adjusting circuit 39. Similarly, a diode $D_2$ couples the saturation control signal $V_C$ to output terminal 79. A common junction $l_4$ is defined by diodes $D_1$ and $D_2$. A transistor $Q_{20}$ has its collector-emitter circuit connected in shunt relation to the circuit path between potentiometer 55 and diode $D_1$. A similar transistor $Q_{21}$ has its collector-emitter circuit connected in shunt relation between the output of comparator 53 and diode $D_2$. Bias circuits 80 and 81 are connected to the base electrodes of transistors $Q_{20}$ and $Q_{21}$, respectively, and further serve to couple collector voltages $S_{C2}$ and $S_{C1}$ to transistors $Q_{20}$ and $Q_{21}$, as shown.

In operation, one or the other of transistors $Q_{20}$ and $Q_{21}$ is rendered conductive. When the respective transistor is conductive, the circuit path shunted thereby is effectively connected to ground potential. For example, when transistor $Q_{20}$ is rendered conductive, this conducting transistor shunts the output from potentiometer 55 to ground potential. However, at the same time, transistor $Q_{21}$ is non-conductive, thereby having no effect upon, and thus enabling, the transmission path from the output of comparator 53, through diode $D_2$ to output terminal 79. Conversely, when transistor $Q_{21}$ is rendered conductive, the conducting transistor effectively shunts saturation control voltage $V_C$ to ground, while transistor $Q_{20}$ is non-conductive, thereby having no effect upon, and thus enabling, the transmission path from potentiometer 55 to output terminal 79. Transistor $Q_{20}$ is rendered conductive when the collector voltage $S_{C2}$ is relatively high, and this condition obtains when the presence of a VIR signal is detected. Thus, when VIR detector 70 detects the presence of the VIR signal, saturation control voltage $V_C$ is supplied from comparator 53 to the collector of non-conducting transistor $Q_{21}$, and through diode $D_2$ to output terminal 79 and thence to level adjusting circuit 39. Conversely, when VIR detector 70 detects the absence of a VIR signal, collector voltage $S_{C1}$ is relatively high so as to render transistor $Q_{21}$ conductive. This shunts the saturation control voltage $V_C$ to ground potential. However, at this time, collector voltage $S_{C2}$ is relatively low, thereby rendering transistor $Q_{20}$ non-conductive, and enabling the manually adjustable control signal derived from potentiometer 55 to be supplied through diode $D_1$ and output terminal 79 to level adjusting circuit 39. Referring now to saturation control circuit 60, this circuit is substantially identical to the circuit shown schematically in FIG. 5, except that a transistor $Q_{17}$ has its collector-emitter circuit connected in parallel with capacitor 78. The base electrode of transistor $Q_{17}$ is supplied with the collector voltage $S_{C1}$ which, it is recalled, is relatively high when VIR detector 70 detects the absence of VIR signal. Thus, in the absence of a VIR signal, transistor $Q_{17}$ is conductive. In the presence of a VIR signal, the collector voltage $S_{C1}$ is sufficiently low such that transistor $Q_{17}$ is non-conductive. In that event, capacitor 78 stores the saturation control signal $V_C$ produced by comparator 53 in the manner described above. However, in the absence of a VIR signal, or in the event that the received color video signal is relatively weak such that, even though it may contain a VIR signal, the color killer signal $S_k$ is produced, the relatively high level of collector voltage $S_{C1}$ renders transistor $Q_{17}$ conductive so as to pre-set a predetermined voltage across capacitor 78.

In one embodiment, the level of the control signal $V_C$ produced by comparator 53 when the color saturation level reaches its desired, or optimum characteristic, is equal to zero. Consequently, the resultant voltage which is stored across capacitor 78 when the optimum color saturation characteristic is attained may be represented as $V_o$, shown in FIGS. 7 and 8 as lying between the maximum and minimum voltage values to which capacitor 78 otherwise would be charged in the absence of a VIR signal. As one example, this voltage level $V_o$ may be equal to zero. In the absence of a VIR signal, transistor $Q_{17}$ is rendered conductive so as to preset capacitor 78 to store a voltage thereacross which also is equal to the level $V_o$. That is, in one embodiment, capacitor 78 may be pre-set, in the absence of a VIR signal, to store a voltage which is approximately equal to the voltage stored thereacross when the optimum color saturation characteristic is achieved in response to a received VIR signal.

If desired, any other pre-set voltage can be supplied to capacitor 78 when transistor $Q_{17}$ is rendered conductive in the absence of a VIR signal or when this transistor is rendered conductive in response to a color killer signal $S_k$. This pre-set voltage may be determined by providing suitable resistor values in the collector-emitter circuit of transistor $Q_{17}$, or by utilizing transistor $Q_{17}$ as a switching transistor to supply a corresponding bias voltage to the capacitor.

Figure 8:
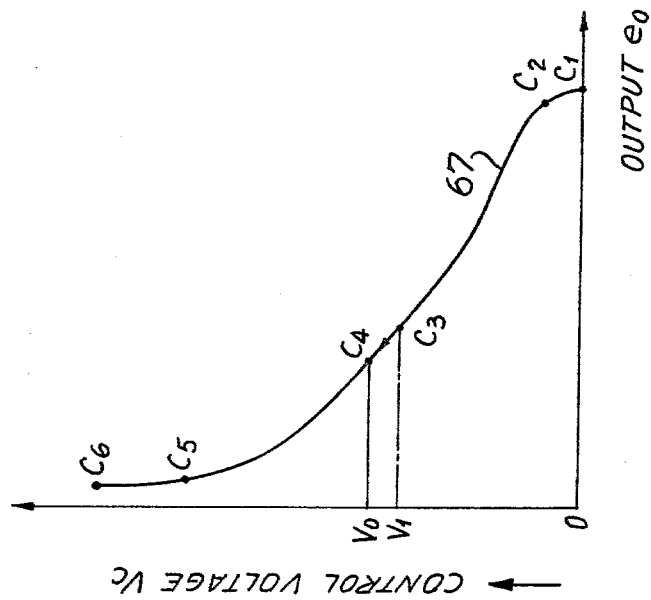
FIGS. 7 and 8 are graphical representations of a problem accompanying the circuit shown in FIG. 2, which problem is overcome by the present invention.

Referring back to FIGS. 7 and 8, let it be assumed that capacitor 78 is pre-set to store the voltage $V_o$ in the absence of a proper VIR signal. Let it be further be assumed that when a VIR signal first is detected, the level of the chrominance component differs from its optimum value such that the corresponding control voltage produced by comparator 53 in response to this VIR signal is equal to a voltage level $V_1$. Saturation control circuit 60 then operates along curve 68 to correct the chrominance component level, and thus the saturation characteristic of the displayed video picture, so as to return the saturation control voltage from level $V_1$ to its desired level $V_o$. As shown by curve 68, this control operation is achieved in a relatively short time interval. Hence, any deterioration in the color characteristics of the displayed video picture are not perceived by a viewer during this brief interval. As also represented in FIG. 8, the operation of the saturation control circuit between the control voltage levels of $V_1$ and $V_o$, that is, between points $C_3$ and $C_4$, is along a relatively linear portion of curve 67. Hence, the loop gain of the saturation control circuit is relatively high, thus corresponding to a relatively short response time for the control circuit to achieve a proper saturation correction operation and attain optimum saturation characteristics of the displayed video picture.

In the circuit configuration of comparator 53 and storage capacitor 78, it is appreciated that, when the optimum color saturation characteristic is achieved, the voltage across capacitor 78 is not equal to the output control voltage $V_C$ produced by comparator 53. This is because capacitor 78 is connected between the output of comparator 53 and the inverting input thereof. As an example, when the optimum color saturation characteristic is attained, the voltage across capacitor 78 is equal to zero, while the output control voltage may be equal to some value $V_C$. In an alternative embodiment, capacitor 78 may be connected between the output of comparator 53 and ground potential. In this alternative case, if the value of control voltage $V_C$ is represented as $V_o$ when the optimum color saturation characteristic is achieved, capacitor 78 will be pre-set to store this predetermined value $V_o$ in the absence of a VIR signal, or when a color killer signal $S_k$ is produced.

Although not shown herein, it is recognized that the hue control circuit 40 may be of a construction similar to the schematic circuit diagram showing the saturation control circuit 60. Of course, in the hue control circuit, the input signal supplied to clamp circuit 37 is the R-Y color difference signal. Thus, a circuit similar to matrix circuit 59 and input stage 51 (FIG. 10) would not be necessary in hue control circuit 40. It is, of course, appreciated that, by pre-setting storage capacitor 78' of hue control circuit 40 to a predetermined level, such as zero, $V_o$, or other desired level, the loop gain of the hue control circuit is increased even at the instant when the video signal receiving apparatus is switched from a broadcase channel which does not include the VIR signal to a channel which does include the VIR signal, or when the receiving apparatus first is energized.

In the embodiment shown in FIG. 9, and shown schematically in FIG. 10, the presence of a VIR signal is ascertained on the basis of the level of the received luminance component during the line interval in which the VIR signal is expected, that is, the nineteenth line interval. In the apparatus shown in FIG. 2, the presence of the VIR signal is made on the basis of the level of one of the demodulated color difference signals during the line interval that the VIR signal is expected. The present invention may be carried out in accordance with either of these VIR detecting arrangements.

While the present invention has been particularly shown and described with reference to a preferred embodiment, it should be readily apparent to one of ordinary skill in the art that various changes and modifications in form and details may be made without departing from the spirit and scope of the invention. It is, therefore, intended that the appended claims be interpreted as including all such changes and modifications.

What is claimed is:

1. In color video signal receiving apparatus of the type capable of receiving a color video signal and having a demodulator for demodulating color signals from the received color video signal, color correcting apparatus responsive to a VIR signal included in said color video signal, said VIR signal including a chrominance reference portion and a luminance reference portion, said color correcting apparatus comprising:
   means for detecting the level of a demodulated color signal during the chrominance reference portion of said VIR signal and for producing a control signal representing the difference between said detected level and a reference level;
   storage means for storing said control signal;
   adjusting means coupled to said demodulator and responsive to said stored control signal for adjusting a predetermined characteristic of said demodulated color signals in accordance with said stored control signal;
   VIR detecting means for detecting the presence and absence of a VIR signal in said received color video signal; and
   pre-setting means coupled to said VIR detecting means and responsive to the absence of a VIR signal from said color video signal for pre-setting said storage means to store a predetermined signal when the received video signal does not include a VIR signal.

2. The apparatus of claim 1 wherein said predetermined signal to which said storage means is pre-set is of a level approximately equal to the level of said control signal when said difference between said detected level and said reference level is at a preselected value.

3. The apparatus of claim 1, further comprising color killer circuit means for generating a color killer signal when the chrominance component of the received color video signal is less than a threshold level; and means for utilizing said color killer signal to pre-set said storage means to store said predetermined signal.

4. The apparatus of claim 3 wherein said means for utilizing said color killer signal comprises conditioning means for conditioning said VIR detecting means to simulate the absence of a VIR signal from said received video signal in response to said color killer signal.

5. The apparatus of claim 4 wherein said VIR detecting means comprises gate signal generating means for generating gating signals at least during those times in which the chrominance reference portion of said VIR signal is received, means responsive to said gating signals for sampling the level of a predetermined component of the received video signal, and comparing means for comparing the sampled level of said predetermined component to a preestablished level to produce a first signal representing the presence of said VIR signal and a second signal representing the absence of said VIR signal, and wherein said conditioning means comprises means for holding said sampled level of said predetermined component to a level whereby said comparing means produces said second signal.

6. The apparatus of claim 5 wherein said receiving apparatus includes a detector for detecting the luminance component included in said received color video signal, and wherein said demodulator demodulates the chrominance component of said received color video signal into respective color difference signals, and wherein said predetermined component sampled by said sampling means is a selected one of said luminance component and color difference signals.

7. The apparatus of claim 1 wherein said storage means comprises a capacitor; and wherein said pre-setting means comprises switch means coupled to said capacitor for supplying said predetermined signal to said capacitor when said received color video signal does not include a VIR signal.

8. The apparatus of claim 7 wherein said switch means comprises a transistor connected in a circuit in shunt relation with said capacitor.

9. The apparatus of claim 1 wherein said means for detecting the level of a demodulated color signal comprises gate signal generating means for generating first gating signals during those times in which the chrominance reference portion of said VIR signal is received and second gating signals during those times in which the luminance reference portion of said VIR signal is received; substracting means having first and second inputs; first means responsive to said first gating signals for sampling said demodulated color signal and for applying a first sampled signal to said first input of said substracting means; and second means responsive to said second gating signals for sampling said demodulated color signal and for applying a second sampled signal to said second input of said substracting means, whereby said substracting means produces said control signal proportional to the first sampled minus the second sampled signal.

10. The apparatus of claim 9 wherein said demodulator produced color difference signals, and said first and second sampling means sample a predetermined one of said color difference signals with said first and second gating signals, respectively.

11. The apparatus of claim 10 wherein the demodulator produces red (R-Y), green (G-Y) and blue (B-Y) color difference signals, and said first and second sampling means sample the red (R-Y) color difference signal.

12. The apparatus of claim 10 further comprising means for supplying a demodulating carrier signal to said demodulator for the demodulation of said color difference signals; and wherein said adjusting means comprises variable phase shifting means for shifting the phase of said demodulating carrier signals as a function of said stored control signal when the presence of a VIR signal in said received color video signal is detected.

13. The apparatus of claim 9 wherein said received color video signal includes a chrominance component, which is demodulated by said demodulator into color difference signals, and a luminance component, and wherein said receiving apparatus further includes a detector for detecting the received luminance component; said means for detecting the level of a demodulated color signal further comprising a matrix circuit for receiving a predetermined one of said color difference signals and for receiving said luminance component to produce a primary color signal, and means for supplying said produced primary color signal to said first and second sampling means for sampling therein with said first and second gating signals, respectively.

14. The apparatus of claim 13 wherein said demodulator produces red (R-Y), green (G-Y) and blue (B-Y) color difference signals, and said matrix circuit receives said blue (B-Y) color difference signal and said luminance component (Y) to produce a blue color signal.

15. The apparatus of claim 13 wherein said adjusting means comprises a level adjusting means for adjusting the level of the chrominance component, before demodulation thereof, as a function of said stored control signal when the presence of a VIR signal in said received color video signal is detected.

16. Color video signal receiving apparatus for receiving a composite color video signal including a luminance component and a chrominance component, the receiving apparatus comprising detector means for detecting the luminance component and color demodulating means for demodulating color difference signals from the chrominance component, and color correcting apparatus responsive to a VIR signal included in the composite color video signal, said VIR signal including a chrominance reference portion and a luminance reference portion, said color correcting apparatus comprising:

adjustable hue control means coupled to said color demodulating means for adjustably controlling said color demodulating means so as to correspondingly adjust the hue of a color video picture reproduced in response to the demodulated color difference signals;

adjustable color saturation control means coupled to said color demodulating means for adjusting the level of the chrominance component supplied to said color demodulating means;

first level detecting means coupled to said color demodulating means for receiving a demodulated color difference signal and for detecting the level of said received color difference signal during the time that said VIR signal is received and for producing a hue control signal in accordance with said detected level;

first storage means for storing said hue control signal;

matrix means for receiving a demodulated color difference signal and said luminance component to produce a simulated color drive signal in response thereto;

second level detecting means for detecting the level of said simulated color drive signal during the time that said VIR signal is received for producing a color saturation control signal as a function of said sampled simulated color drive signal;

second storage means for storing said color saturation control signal;

first switch means for selectively coupling said hue control signal from said first storage means to said adjustable hue control means;

second means for selectively coupling said color saturation control signal from said second storage means to said adjustable color saturation control means;

VIR detecting means for detecting when the received video signal includes a VIR signal and when a VIR signal is not present in the received video signal;

means for conditioning said first and second switch means to couple said hue and color saturation control signals, respectively, to said adjustable hue control means and to said adjustable color saturation control means, respectively, when the presence of a VIR signal is detected; and pre-setting means coupled to said VIR detecting means and responsive to the absence of a VIR signal from the received video signal for pre-setting said first and second storage means to store respective predetermined signals when said received video signal does not include a VIR signal.

17. The apparatus of claim 16 further comprising gate signal generating means for generating first gating signals during those times corresponding to the interval when the chrominance reference portion of said VIR signal is received and second gating signals during those times corresponding to the interval when the luminance reference portion of said VIR signal is received; and wherein each of said first and second level detecting means comprises first means responsive to said first gating signals for sampling a respective one of said color difference signal or said simulated color drive signal, second means responsive to said second gating signals for sampling a respective one of said color difference signal or said simulated color drive signal, and comparator means for comparing the first and second sampled signals from said first and second sampling means to produce a control signal as a function of the comparison therebetween.

18. The appartus of claim 17 wherein each of said first and second storage means comprises a capacitor; and wherein said pre-set means comprises first and second switch means coupled to the first and second capacitors, respectively, and actuable to supply predetermined signals to said first and second capacitors, respectively, when said VIR detecting means detects the absence of a VIR signal from said received video signal.

19. The apparatus of claim 18 wherein each of said comparator means comprises a difference amplifier having inverting and non-inverting inputs, respectively, and an output; and wherein each of said first and second capacitors is connected between the output and the inverting input of a corresponding one of said difference amplifiers.

* * * * *